(12) United States Patent
Courbon

(10) Patent No.: US 6,814,336 B2
(45) Date of Patent: Nov. 9, 2004

(54) KEY SYSTEM FOR A MIRROR ASSEMBLY

(75) Inventor: Emmanuel Courbon, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 10/227,628

(22) Filed: Aug. 23, 2002

(65) Prior Publication Data

US 2004/0036000 A1 Feb. 26, 2004

(51) Int. Cl.[7] .............................................. A47G 1/24
(52) U.S. Cl. ...................................................... 248/478
(58) Field of Search ........................... 248/478, 475.1, 248/476, 477; 357/871, 872

(56) References Cited

U.S. PATENT DOCUMENTS

| | | | | |
|---|---|---|---|---|
| 2,641,429 A | * | 6/1953 | Kozak ........................... 248/65 |
| 3,778,015 A | * | 12/1973 | Holzman .................. 248/475.1 |
| 3,920,787 A | * | 11/1975 | McDowell et al. .......... 264/263 |
| 4,523,736 A | * | 6/1985 | Manzoni ..................... 248/483 |
| 4,651,965 A | * | 3/1987 | Vigna et al. ................ 248/483 |
| 4,824,065 A | | 4/1989 | Manzoni |
| 4,880,407 A | | 11/1989 | Carton-Bacon |
| 4,988,068 A | * | 1/1991 | Yamana et al. ............. 248/484 |
| 5,022,748 A | * | 6/1991 | Espirito Santo ............ 359/881 |
| 5,044,596 A | | 9/1991 | do Espirito Santo |
| 5,060,905 A | * | 10/1991 | Sharp ......................... 248/479 |
| 5,081,546 A | | 1/1992 | Bottrill |
| 5,107,374 A | * | 4/1992 | Lupo et al. ................. 359/841 |
| 5,120,015 A | * | 6/1992 | do Espirito Santo ........ 248/479 |
| 5,137,247 A | | 8/1992 | Lang et al. |
| 5,722,629 A | | 3/1998 | Lang et al. |
| 6,092,778 A | | 7/2000 | Lang et al. |
| 6,206,553 B1 | * | 3/2001 | Boddy et al. ............... 362/494 |
| 6,286,968 B1 | | 9/2001 | Sailer et al. |
| 2003/0117732 A1 | * | 6/2003 | Stenzel ........................ 359/872 |

FOREIGN PATENT DOCUMENTS

GB          2229981 A   * 10/1990   ............. B60R/1/06

* cited by examiner

Primary Examiner—Ramon O. Ramirez
Assistant Examiner—A. Joseph Wujciak
(74) Attorney, Agent, or Firm—McNair Law Firm, P.A.

(57) ABSTRACT

A locking device is provided for mounting a support arm for a mirror assembly to a motor vehicle. The locking device including an extension, a complementary extension, and a key to lock the locking device together. A complementary brace cooperates with the locking device to mount another portion of the support arm to the motor vehicle. A method for using the locking device and the brace is also provided.

25 Claims, 6 Drawing Sheets

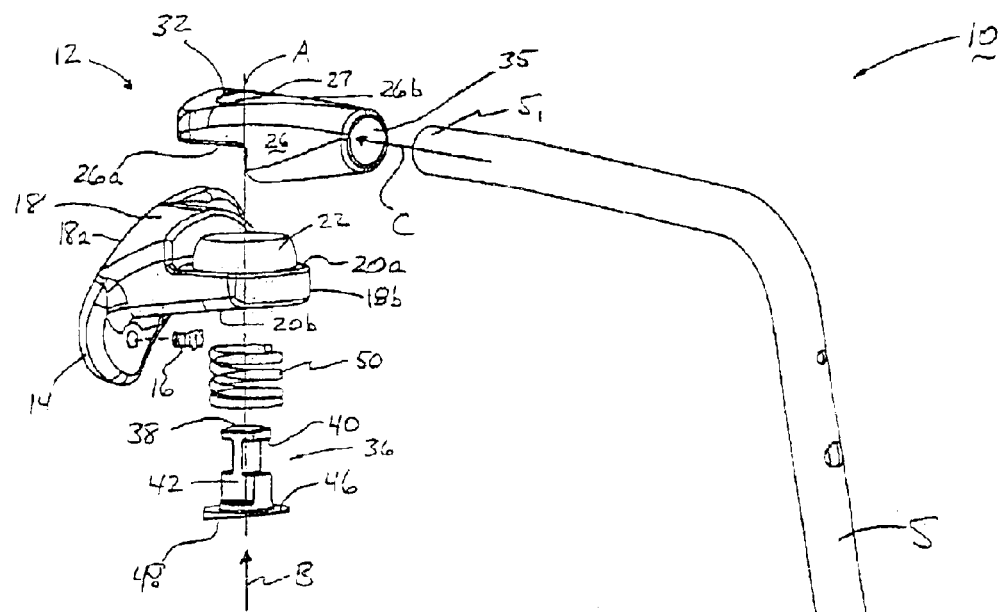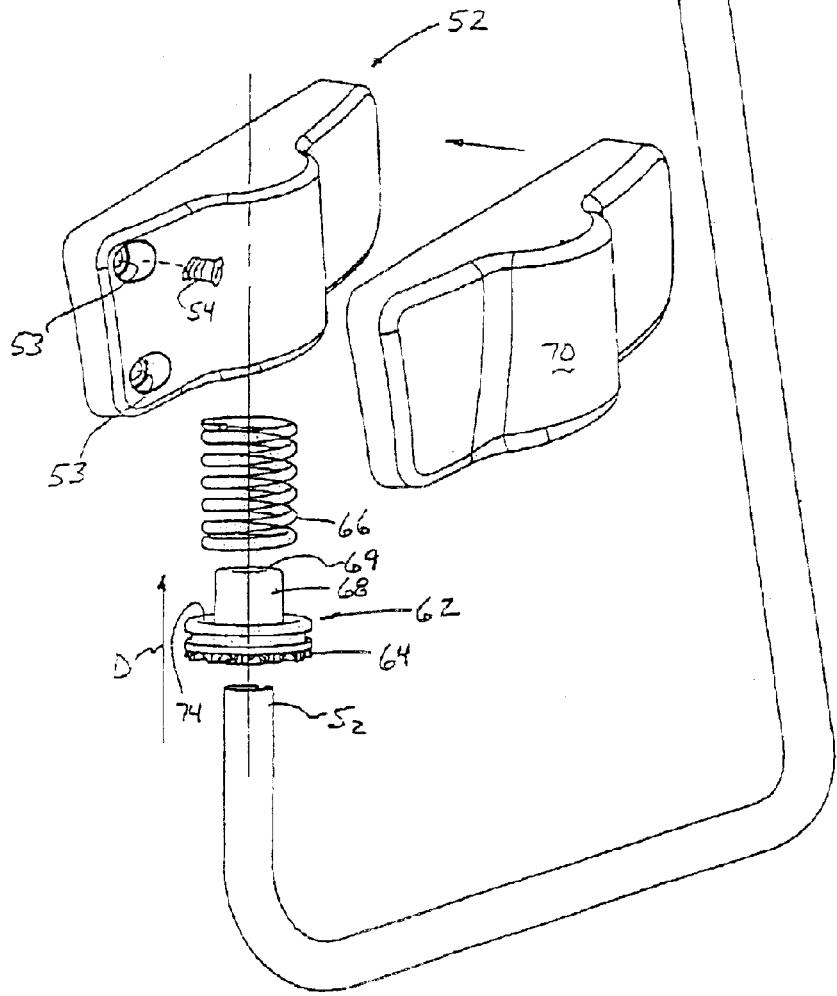
Fig 2

KEY SYSTEM FOR A MIRROR ASSEMBLY

FIELD OF THE INVENTION

The present invention relates to a rear-view mirror assembly, particularly a locking device for mounting mirrors on commercial vehicles such as trucks.

BACKGROUND OF THE INVENTION

Rear-view mirror assemblies for vehicles, particularly for commercial trucks, are well known in the art. These well known mirror assemblies include many different arrangements for mounting mirror assemblies on the vehicles. On large, commercial vehicles, such as trucks and busses, mirrors are often secured within mirror housings mounted so as to extend the mirror out from the vehicle thereby providing a clear view of different areas around the vehicle. Depending on the size and design of the mirror, as well as the area around the vehicle to be observed, different mounting arrangements have been used. A typical mounting arrangement includes a bar extending outwardly from the vehicle, often in substantially a U-shape, in which the ends of the U-bar are attached to the side of the vehicle. Alternately, a bar may be attached to the vehicle at only one end, with a mirror housing being disposed at a distal end or central portion, or both, of such bar. In either of such applications, mounting bars are typically attached to each side of the driver's cab of a truck, and the mirror housing is attached to the central portions of the bars in various ways.

Some conventional mounting arrangements suffer from complicated constructions requiring, for instance, adapters, multiple piece connectors, and a variety of screws, bolts and the like to attach the bar to the mounts and to the vehicle. Such complicated mounting arrangements are more cumbersome, costly and labor intensive than may be desired.

BRIEF SUMMARY OF THE INVENTION

In general, the present invention provides a locking key system for a motor vehicle for adjustably mounting a mirror attached to a support arm. The component parts of the locking key system are simple, reliable, and economical to manufacture and use. For instance, the locking key system has relatively few parts and quickly locks and unlocks from the support arm. Other aspects and advantages of the invention will be apparent from the following description and the attached drawings, or can be learned through practice of the invention.

In one aspect of the invention, the key system includes a locking device configured to receive a portion of the support arm to mount the support arm to the motor vehicle. The locking device includes an extension, a complementary extension, and a key. Further, a spring or similar device is included to urge the extension and the complementary extension together. The extension and complementary extension respectively define a spherical surface and a complementary spherical surface. The spherical surface and complementary spherical surface are matingly arranged to provide a finite range of movement to the support arm and to reduce manufacturing tolerances and costs. The system also includes a brace which cooperates with the locking device to receive another portion of the support arm to mount the support arm to the motor vehicle. The brace includes an anchor and a support arm holder to fix the support arm relative to the brace.

In another aspect, the invention provides a method for assembling a mirror mounting assembly. The method includes the steps of providing a locking device comprising an extension and a complementary extension which mate together, a key which includes an insertion end which defines a mating shoulder, and a spring disposed about the key. The complementary extension receives a portion of a support arm to mount the support arm to a motor vehicle. Further steps include inserting the key through an aperture in the extension and a complementary aperture in the complementary extension; increasing an axial pressure on the inserted key to compress the spring about the key; rotating the inserted key; and releasing the inserted key such that the mating shoulder cooperates with the complementary extension to maintain compression on the spring to movably hold the extension and complementary extension together.

BRIEF DESCRIPTION OF THE DRAWINGS

Further details of the invention may be found in the following detailed description of the invention with the aid of the drawings in which:

FIG. 2 is an exploded view of the mirror mounting assembly as shown in FIG. 1;

DETAILED DESCRIPTION OF THE DRAWINGS

Figure 1:
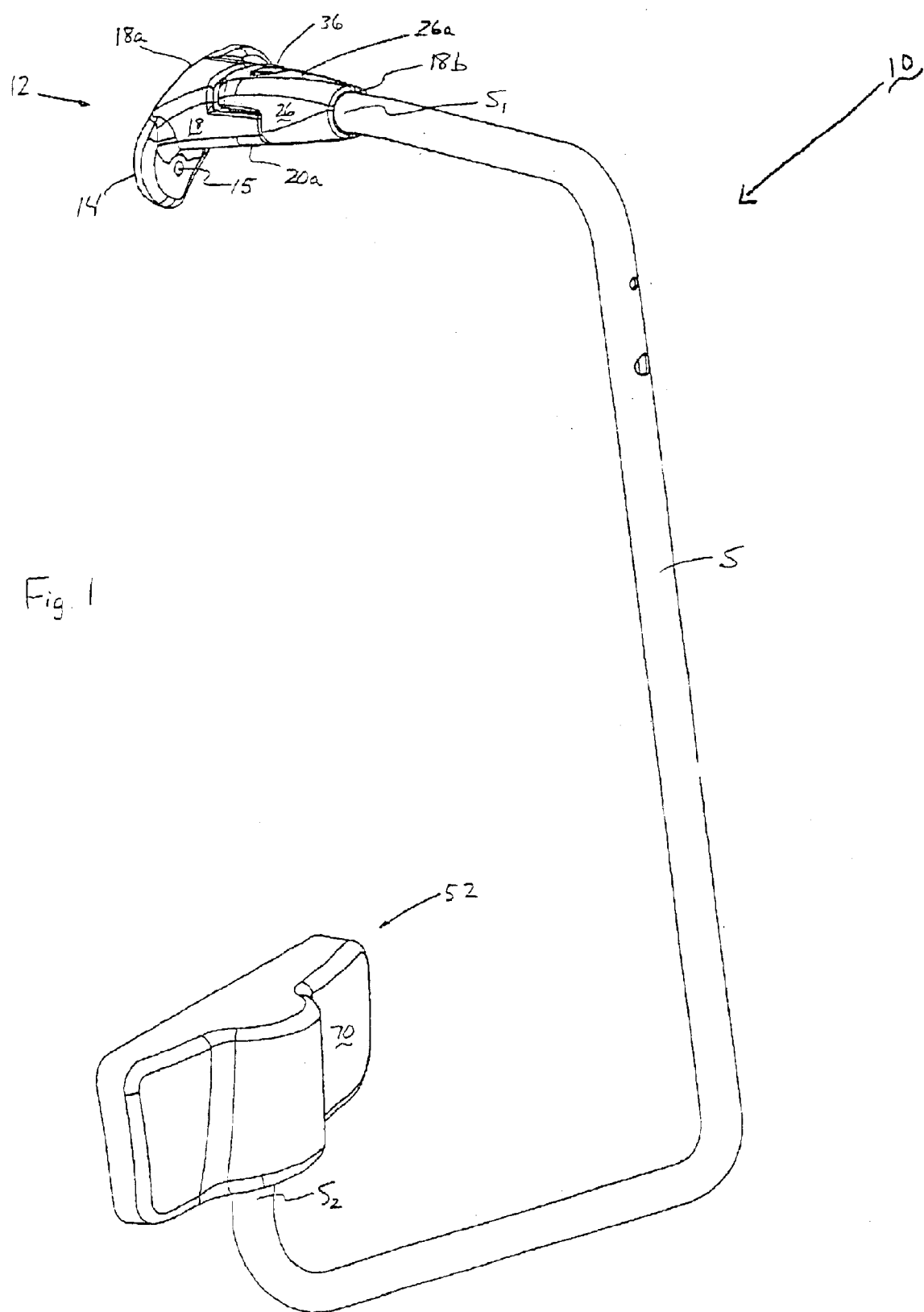
FIG. 1 is a perspective view of a mirror mounting assembly in accordance with an aspect of the invention, as used on a vehicle.

Detailed reference will now be made to the drawings in which examples embodying the present invention are shown. The drawings and the detailed description provide a full and detailed written description of the invention, and of the manner and process of making and using it, so as to enable one skilled in the art to make and use the invention, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

One exemplary embodiment of a locking key system for a mirror assembly according to the present invention is broadly embodied in FIGS. 1–6. The locking key system, generally designated by the numeral 10, is shown in FIG. 1 with a locking device 12 and a brace 52 to which a mirror assembly support arm S is attached. A mirror assembly (not shown) is attachable to the support arm S, and the entire locking key system 10 with support arm S and mirror assembly is attached to a vehicle (not shown). It is to be understood that support arm S may be any sort, size, or shape of mounting bar, tube, rod or the like. Likewise, any type of mirror assembly may be utilized according to the present invention. As will be described in more detail below, the support arm S is attached by its respective end portions $S_1$ and $S_2$ to the locking device 12 and the brace 52 to mount the support arm S and its mirror assembly to the vehicle.

The locking device 12 and the brace 52 and their related components are shown in greater detail in FIGS. 2–6. As shown therein, the locking device 12 and brace 52 have respectively a plurality of holes 15, 53 for receiving respective screws 16, 54. (See FIG. 2). The screws 16, 54 are inserted through their respective holes 15, 53 to attach the locking key system 10 to the vehicle. It is to be understood that these holes 15, 53 and screws 16, 54 are provided by way of example only and are not intended to limit the invention to this form of vehicle attachment. For instance, screws 16, 54 can be pins, rivets, bolts and similar devices. Moreover, suction devices or other non-penetrating forms of attachment in lieu of or in addition to the holes 15, 53 and screws 16, 54 are contemplated by the invention.

With particular reference to FIG. 2, the locking device 12 is shown with an attachment element 14, an extension 18, a complementary extension 26, a locking key 36, and a helical spring 50. The attachment element 14 may be a separate component of the locking device 12, but as shown in this example is unitarily formed with the extension 18 of a lightweight material. This material may be an elastomeric material, a plastic, a high density polyethelene, a polymer, a polyoxymethylene (acetal plastic) material or similar moldable materials. If desired, wood or various metals can also be used.

In one aspect of the invention, structural or engineered plastics are utilized, which offer strength, durability and light weight. Such structural plastics include glass-filled plastics, such as glass-filled nylon, fiberglass, and KEVLAR® available from DuPont™, Spruance, Va.

If moldable lightweight materials are used, the attachment element 14 and extension 18 can be unitarily constructed by blow-molding, injection molding, press-forming and similar processes. Accordingly, the components of the locking device 12 including the complementary extension 26 may be formed to any desired shape or size.

Figure 4:
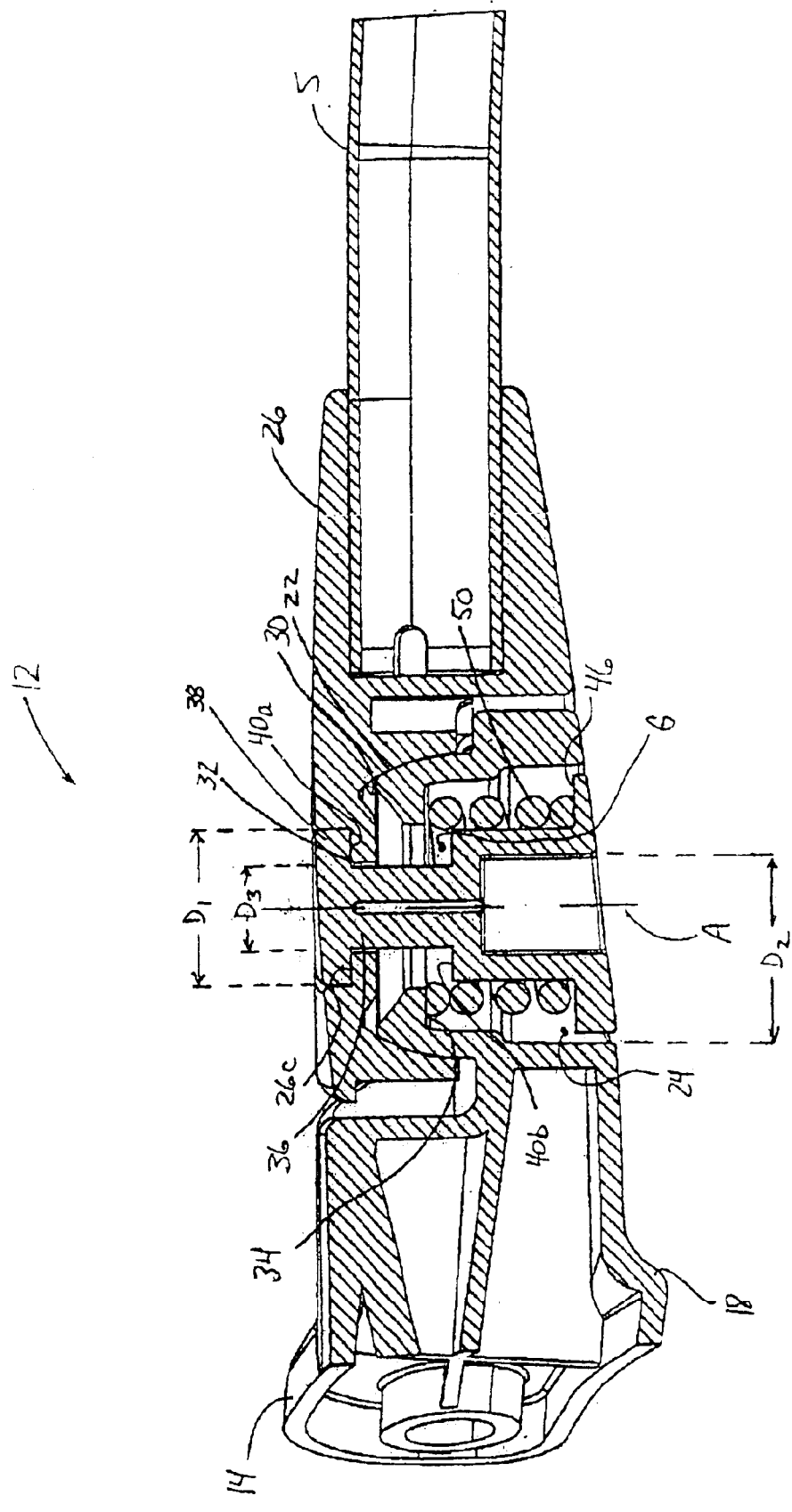
FIG. 4 is a partial cross-sectional view of the locking device similar to FIG. 3.
Figure 6:
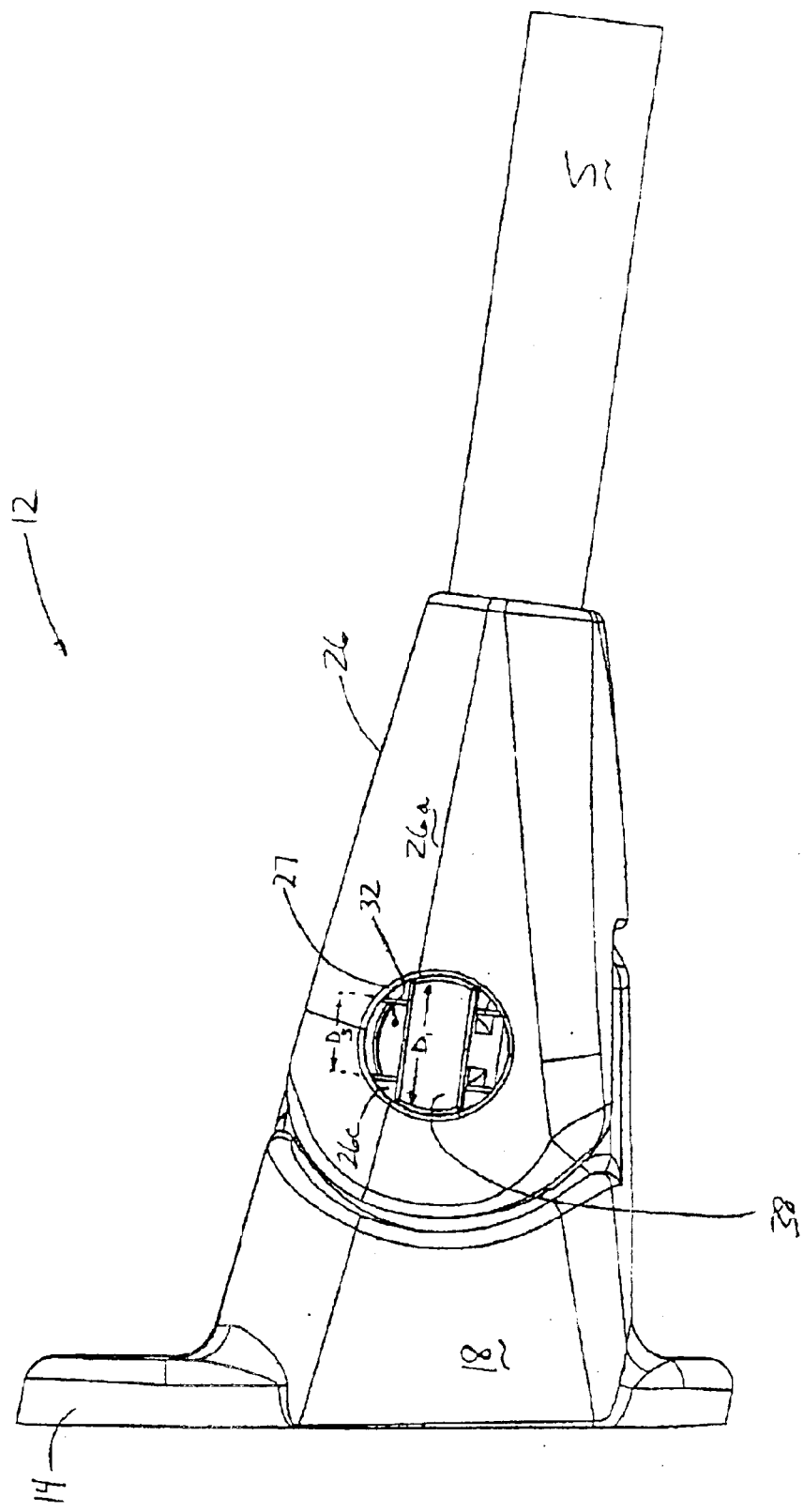
FIG. 6 is a detailed top plan view of the locking device, particularly illustrating an operative position of a locking key according to an aspect of the invention.

The locking key 36, seen most clearly in FIGS. 2 and 4, is a bayonet-type key in this example, which defines an insertion or engagement end 38, a key body 42, and a control end 48. The locking key 36 is at least partially inserted within the spring 50, which is sufficiently large t fit about a diameter $D_1$ of the locking key 36 but not so large as to slip past a mating surface 46 of the control end 48. The locking key 36 and spring 50 are then inserted into an aperture or opening 24 of the extension 18 and into a complementary aperture or opening 32 of the complementary extension 26 to lock the locking device 12 together. The aperture or openings 24, 32 define respective diameters $D_2$ and $D_3$ which are sufficiently large to accept the diameter $D_1$ of the locking key 36 therethrough. FIGS. 4 and 6 show the completed operation of the locking key 36 and the spring 50 relative to the remainder of the locking device 12, as will be described in greater detail below.

Figure 3:
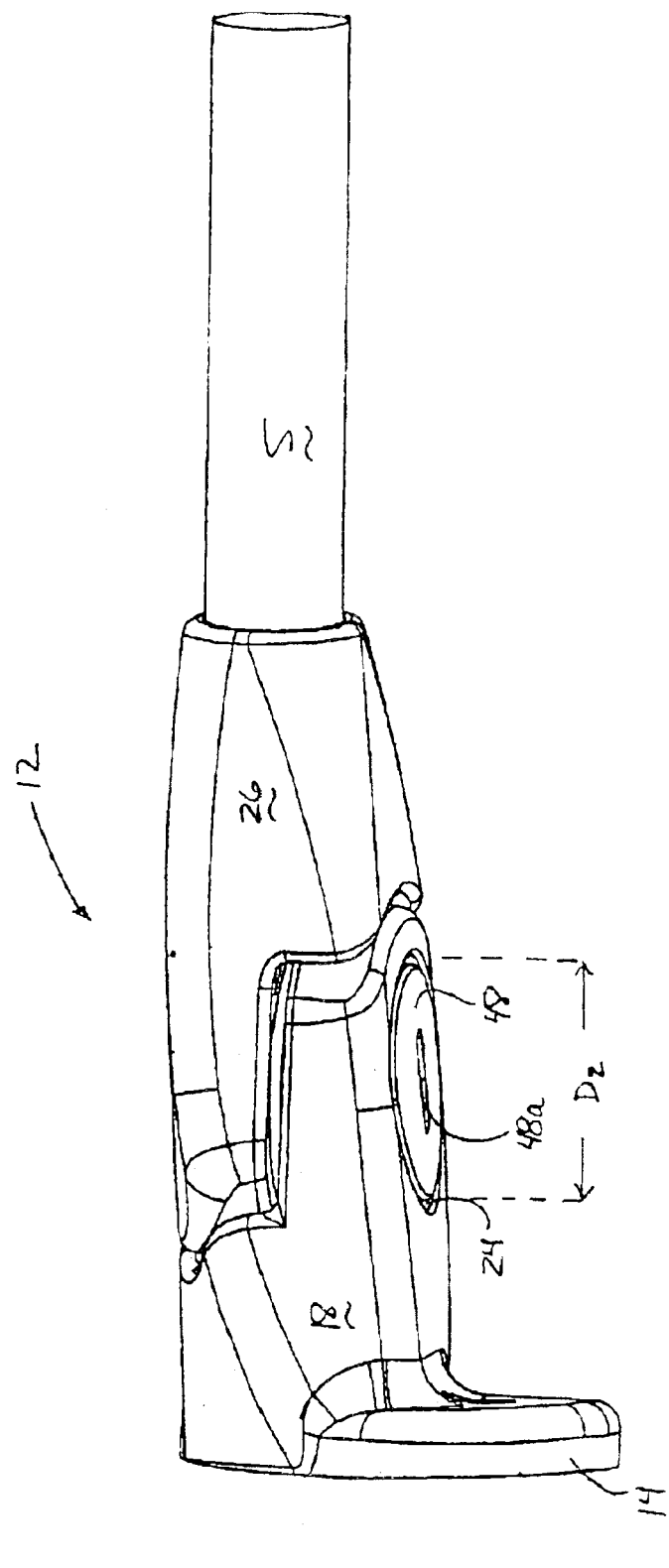
FIG. 3 is a partial view of a locking device of the mirror mounting assembly as shown in FIG. 1.

Seen most clearly in FIGS. 2–4, the extension 18 and the complementary extension 26 are complimentarily shaped to fit closely together. The extension 18 and the complementary extension 26 respectively define a first surface 20a having a spherical surface 22, and a first complementary surface 26a with a first complementary spherical surface 30, which are designed to movably mate together. However, the extension 18, the complementary extension 26, and their respective spherical surfaces 22, 30 are not necessarily exact shape-fits. As will be explained in greater detail below, this arrangement permits some interplay between the extension 18 and the complementary extension 26 to allow a degree of three-dimensional adjustment to the support arm S. It should also be understood that a plurality of different designs of extensions and spherical surfaces are within the scope of the present invention. For example, a second complementary extension with a second complementary spherical surface can be provided to movably mate with another spherical surface opposite the spherical surface 22. The locking key 36, described below, would be designed to operatively penetrate this second complementary extension, or two such keys could be provided.

FIG. 2 further shows the brace 52 with a support arm holder 62 and a helical brace spring 66. An optional detachable cover 70 is shown in this example for covering the brace 52. The detachable cover 70 may be aesthetically desirable to cover the holes 53 and screws 54 described above if such an attachment is utilized, and/or to provide an outer surface of a selected color. The brace 52, the support arm holder 62, and/or the cover 70 may be formed of the lightweight materials introduced above with respect to the locking device 12.

Figure 5:
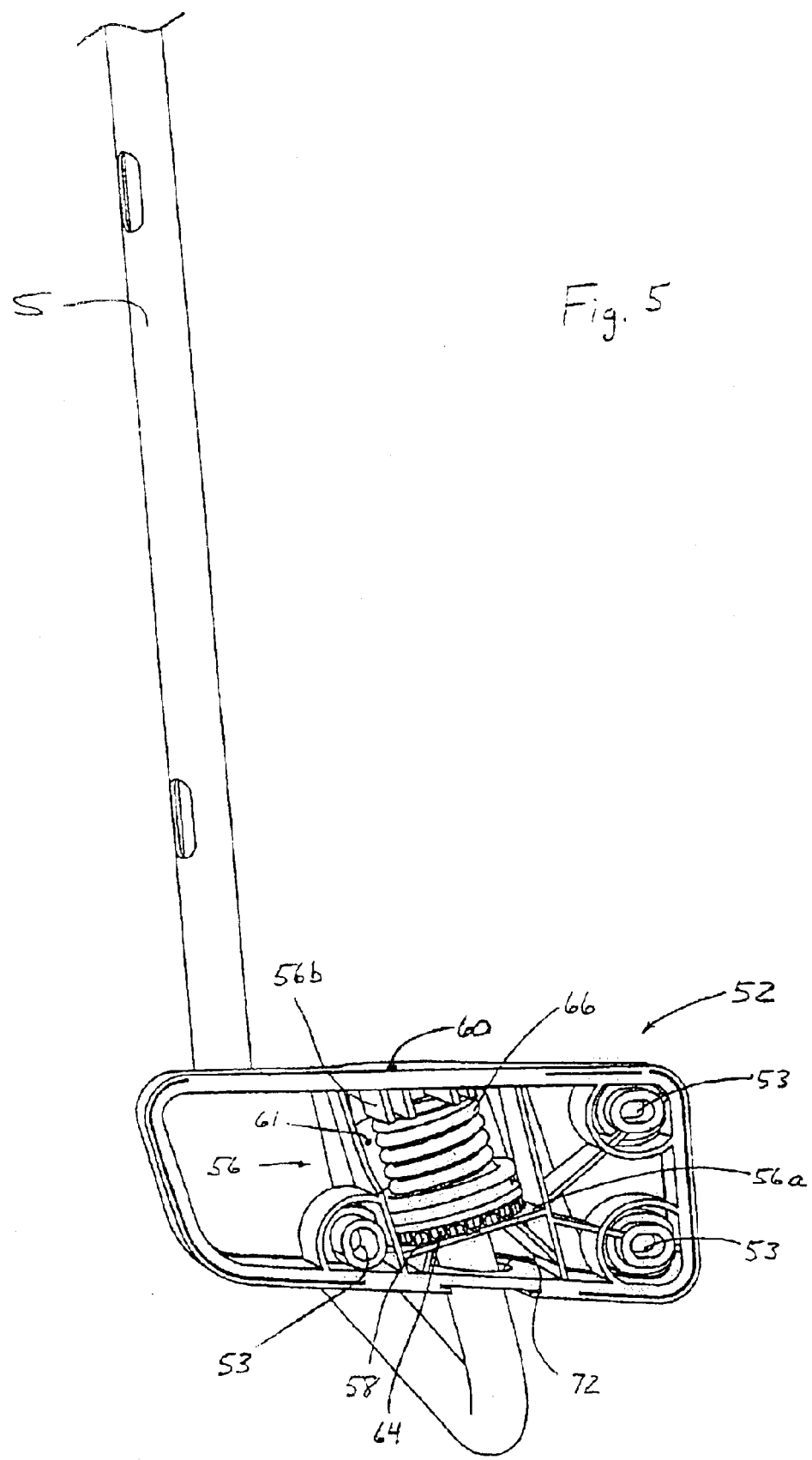
FIG. 5 is a partial elevational view of a brace of the mirror mounting assembly as shown in FIG. 1.

With reference to FIGS. 2 and 5, the brace 52 further includes an anchor piece 56 and/or cavity 61, an anchor area 60, and a conduit 72. The anchor piece 56 defines a surface 56a and at least one stop 56b. A plurality of teeth 58 extend from the surface 56a. The plurality of teeth 58 together with the stop 56b, fix the support arm holder 62 within the brace 52 by a complementary set of teeth 64 and a compressed brace spring 66. Assembly and operation of the brace 52 and these components are described below.

The locking device 12 is easily assembled by simply mating the extension 18 with the complementary extension 26 as shown in FIGS. 2–4 and 6. The locking key 36 and spring 50, as briefly introduced above, are then inserted in a direction C into the aperture or opening 24 of the extension 18 and through the complementary aperture or opening 32 of the complementary extension 26, substantially perpendicular to the extensions 18, 26 in this example. The exemplary spring 50 defines a spring constant, which resists compression. However, continued insertion pressure in direction B on the locking key 36 compresses the spring 50 between a circumferential inner surface or shoulder 34 of the extension 18 and a mating surface or ledge 46 of the control end 48 of locking key 36. In this example, the diameter $D_1$ of the insertion end 38 permits the insertion end 38 to pass through the complementary aperture 32 under the continued insertion pressure. Although not shown, a momentary gap is eventually achieved as a ledge or shoulder 40a of the locking key 36 is spaced apart from a circumferential shoulder 26c of the complementary extension 26 (to the extent allowed by a spacing or gap G between a second limiting shoulder 40b and the inner surface or shoulder 34 and the physical presence of spring 50. During this momentary gap between the shoulder 26c and the shoulder 40a, the locking key 36 can be rotated 90 degrees or one-half turn, for instance, and released. The spring constant of the spring 50 forces the shoulder 26c of engagement end 38 and the shoulder 40a adjacent opening 32 together to assume a locked position as shown in FIGS. 4 and 6. As clearly shown in FIG. 4, shoulder 40a is recessed positioning the outer surface of key 36 substantially flush with the contoured surface.

It is to be understood that any spring constant mechanism may be used in place of or in addition to spring 50 in the foregoing example. For instance, a circumferentially shaped rubber gasket, o-ring or similar devices defining a similar spring constant as spring 50 can be suitably substituted. It is to be further understood that the specific shapes and elements of the locking key 36 are shown by way of example only and do not limit the invention to the particular exemplary locking key 36. For instance, the locking key 36 could be two or more components which attach together proximate the gap G. Likewise, the shapes of shoulders 26c, insertion end 36, and shoulder 40a could be inclined or camming surfaces or a variety of other matable arrangements and remain within the invention's scope.

As briefly introduced, the extension 18 and the complementary extension 26 respectively include spherical surface 22 and complementary spherical surface 30. The spherical surfaces 22, 30 are designed to movably mate together. According to this aspect of the invention, a spherical-conical combination utilizing partial hemispheres and cones that slope from about 0 degrees to about 35 degrees leverage or multiply pressure to create higher friction. In contrast, flat surfaces, e.g., two horizontal planar surfaces mated together, require very high pressure to achieve the same locking result with a spring.

In this example, the spherical surface 22 slopes approximately 10 degrees from vertical, designated generally by an axis A in FIG. 4. By comparison, the complementary spherical surface 30 slopes approximately 20 degrees from the axis A to permit some interplay between the spherical surfaces 22, 30. Thus, the extension 18 and the complementary extension 26 are spherically fitted to allow a degree of three-dimensional movement of the support arm S. Such adjustability is useful for example, to make tolerances less critical during manufacturing and to relieve stresses on the device in use. In contrast, if the spherical surfaces 22, 30 were each closer to 7–8 degrees from vertical, a "locking taper" or total locking fit between the spherical surfaces 22, 30 could occur. Although this may be desirable in some cases and a range of about 0 degrees to about 35 degrees as stated above is within the scope of the present invention, it should be noted that nearing vertical will substantially prevent movement of the extension 18 and the complementary extension 26 to adjust the support arm S. It is to be further noted that it is within the scope of the invention to substitute or modify spherical surfaces 22, 30 with other shapes such as pyramids, squares, rectangles, cylinders and the like, including adding detent elements in the spherical surfaces 22, 30 or any of the foregoing shapes for fixed adjustments of the support arm S. Further, it is also within the scope of the invention to add hard stops (not shown) on one or both extensions 18, 26 to prevent the support arm S from adjusting beyond a desired envelope of movement. Stops are known and further discussion is not needed to appreciate this aspect of the invention.

As seen in FIGS. 2 and 5. the brace 52 is structured to form cavity 61 between the lower surface of stop 56b and teeth 58 formed on the upper surface of shelf 56a. Brace 52 is assembled by placing spring 66 over body 68 of the support arm holder. compressing spring 66 and inserting the spring and support arm holder into cavity 61. Teeth 64 of the support arm holder are positioned to mate with teeth 58 carried by shelf 56a to prevent rotation of the support arm holder. Cavity 61 including teeth 58 and stop 56b define an anchor for support arm holder 62.

Support arm holder 62 includes a recess, extending from shoulder 74 to mating end 69. When the support arm holder is positioned in cavity 61 as described, the recess is aligned with conduit 72. End 52 of support arm S is inserted through conduit 72 into the recess in support arm holder 62 and secured thereto with an adhesive. In this condition, teeth 58 of shelf 56a and complementary teeth 64 of support arm holder 62 cooperate to prevent support arm S from rotational movement. Spring 66 is compressed between stop 56a and shoulder 74 of support arm holder 62 urging teeth 58 and 64 in fixed relative positions. The stop 56b is illustrated as a plurality of rectangular-shaped projections spaced apart from each other and depending into the cavity 61. However, any form or arrangements of stops as known in the art may be suitably utilized for stop 56b.

Moreover, also like spring 50, various other devices may be substituted for the spring 66 in the brace 52, such as o-rings, rubber gaskets and similar mechanisms. In one aspect of the present invention, in lieu of or in addition to the spring 66, any or all of the brace 52 and the support arm holder 62 may be formed of various elastomeric materials, as previously described. In this aspect, the anchor piece 56 defines the cavity 61, which is located near an anchor area 60. The stop 56b depends into the cavity 61 from proximate the anchor area 60. The support arm holder 62 is larger than the cavity 61 as defined by the protruding stops 56b. As such, when the support arm holder 62 is press-fit into the cavity 61, a mating end 69 of the support arm holder 62 is pressed against the stop 56b and in turn, the anchor area 60 deformably yields to fix the support arm holder 62 in the cavity 61. Stated another way, a deforming action of the deformable material of at least the anchor area 60 substitutes for the spring 66 and/or the teeth 58 of the brace 52 and the complementary teeth 64 of the support arm holder 62. It is to be understood that the brace 52 could alternatively be formed of a harder material and the support arm holder 62 be formed of the more deformable material to reach the same result as above.

As seen in the Figures but particularly in FIG. 2, the end portion $S_1$ of the support arm S is slid axially into a support arm end 35 of the complementary extension 26 in the direction of an arrow C. Similarly, the end portion $S_2$ is slid into the conduit 72 of the brace 52 in the direction of the arrow D. These end portions $S_1$, $S_2$ are respectively securable in the locking device 12 and the brace 52 such that the support arm S is fixed relative to the complementary extension 26 of the locking device 12 and the support arm holder 62 of the brace 52. More specifically, the end portions $S_1$, $S_2$ are securable with an adhesive substance such as glue, a heat-activated glue substance, a paste, an adhesive, an epoxy, or an epoxy resin. Alternatively, the end portions $S_1$, $S_2$ are securable with mechanical devices such as cotter keys, pins, rivets, screws, or bolts. It is to be understood that end portions $S_1$, $S_2$ and their respective mating receptacles, support arm end 34 and conduit 72 need not be circular shaped as illustrated. For instance, these elements may be square, rectangular, oval, star-shaped, or various other shapes and may exhibit other geometries and orientations and be within the scope of the invention.

In light of this description, it will be apparent to those skilled in the art that various modifications and variations can be made in the present invention without departing from the scope and spirit of the invention. For example, specific shapes of various elements of the illustrated embodiments may be altered to suit particular applications. In particular, the orientation of extensions 18 and 26 may be reversed so that either may be atop the other. Also, the location of the surfaces 20a and 26a may be reversed so that either may extend out or comprise a cavity for receiving the other. It is intended that the present invention include such modifications and variations as come within the scope of the appended claims and their equivalents.

What is claimed is:

1. A locking system for adjustably mounting a mirror with a motor vehicle comprising:

a locking device for mounting a repositionable support arm to a vehicle;

said support arm adapted to support said mirror;

said locking device including an extension adapted to be secured to said motor vehicle having a spherical surface and a complementary extension to be secured to said support arm having a complementary spherical surface;

an opening formed in said spherical surface and an opening formed in said complementary spherical surface;

a shoulder formed adjacent at least one of said openings;

a key having an integral engagement end;

a spring carried by said key; wherein, said support arm is adjusted to a desired position with said complementary spherical surface engaged over said spherical surface with said openings aligned, and said key extending through said openings with said engagement end positioned in contact with said shoulder, said spring being compressed between said key and said extension urging said spherical and complementary spherical surfaces into locking engagement fixing said locking devices in said adjusted position.

2. The locking device of claim 1 wherein said spherical surface and said complementary spherical surface are configured at differing degrees from vertical.

3. The locking device of claim 1 wherein said extension and complementary extension are plastic.

4. The locking device of claim 1 herein said extension and complementary extension are formed of one of elastomeric material, a polyoxmethylene material, a high density polyethylene, a polymer, a structural plastic, a glass filled plastic, a glass filled nylon and combination thereof.

5. The locking device of claim 1 wherein said complementary extension includes a support end having a recess for receiving and securing with an end of said support arm.

6. The locking device of claim 5 wherein said support end is secured in said recess with an adhesive.

7. The locking device of claim 1 wherein said key includes a body and a control end, said spring being compressed between said control end and said extension.

8. The locking device of claim 1 wherein said extension includes an attachment element for securing with said vehicle.

9. The locking device of claim 1 wherein said opening formed in complementary extension is substantially rectangular and said shoulder extends along opposed sides thereof.

10. The locking device of claim 9 wherein said shoulder is recessed in said opening of said complementary extension.

11. The locking device of claim 1 wherein said opening formed in said extension includes a recessed shoulder, said spring being received in said opening between said recessed shoulder and a control end of said key.

12. The locking system of claim 1 further including a brace for securing with said vehicle, said brace being adapted to support a second end of said support arm.

13. The locking system of claim 12 wherein said brace includes an anchor, a support arm holder and a compression spring;

said support arm holder carrying said compression spring in compressed condition in said anchor.

14. The locking system of claim 13 wherein said anchor and said support arm holder each include teeth, said spring urging said teeth into mating position.

15. The locking system of claim 13 wherein said support arm holder includes a recess in which said second end of said support arm is received.

16. A locking system for mounting a mirror with a motor vehicle comprising:

a brace for mounting a support arm with a vehicle;

said brace including an anchor and a support arm holder;

said anchor having a cavity defined by a stop and an opposing spaced shelf with teeth;

said support arm holder having a body, complementary teeth, and a recess; whereby, said support arm holder is resiliently locked in fixed position within said cavity between said stop and said shelf with said teeth and said complementary teeth engaged; and, said support arm is positioned and secured within said recess of said support arm holder locking said support arm in an adjusted fixed position for mounting said mirror.

17. The locking system of claim 16 including a spring carried by support arm holder.

18. The locking system of claim 16 wherein said support arm holder includes a shoulder and a spring supported between said shoulder and said stop.

19. The locking system of claim 16 wherein an adhesive secures said support arm with said support arm holder.

20. The locking system of claim 16 wherein said anchor is formed of plastic.

21. A method for assembling a mirror mounting assembly, the method comprising the steps of:

providing a locking device configured to receive a portion of a support arm to mount the support arm to a motor vehicle;

providing the locking device including an extension having an opening, a complementary extension having an opening, a key with an engagement end and a spring;

configuring the extension and complementary extension to mate together with said openings aligned;

positioning the spring about the key; and inserting the key through the opening in the extension and the opening in the complementary extension compressing the spring;

rotating the inserted key positioning the engagement end over a shoulder adjacent said opening in said complementary extension for securing the key in a locked position;

releasing the inserted key such that the engagement end cooperates with the shoulder of said complementary extension urging said complementary extension into an adjusted fixed position.

22. The method of claim 21, further comprising the steps of reversing the rotation of the inserted key to release the maintained extension and complementary extension.

23. The method of claim 21 further comprising the step of providing a brace configured to receive another portion of the support arm to assist in mounting the support arm to the motor vehicle.

24. The method of claim 23 providing the brace with an anchor and a support arm holder, and attaching the support arm with the support arm holder and attaching the support arm holder with the anchor.

25. The method of claim 24, including using an adhesive when securing the support arm with the support arm holder.

* * * * *